United States Patent
Pedron et al.

(10) Patent No.: US 10,974,218 B2
(45) Date of Patent: Apr. 13, 2021

(54) FLUIDIZED BED REACTOR FOR PRODUCTION OF GRANULAR POLYCRYSTALLINE SILICON

(71) Applicant: WACKER CHEMIE AG, Munich (DE)

(72) Inventors: Simon Pedron, Burghausen (DE); Bernhard Baumann, Emmerting (DE); Gerhard Forstpointner, Kastl (DE)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 16/641,375

(22) PCT Filed: Aug. 23, 2017

(86) PCT No.: PCT/EP2017/071258
§ 371 (c)(1),
(2) Date: Feb. 24, 2020

(87) PCT Pub. No.: WO2019/037850
PCT Pub. Date: Feb. 28, 2019

(65) Prior Publication Data
US 2020/0188870 A1    Jun. 18, 2020

(51) Int. Cl.
*B01J 8/18* (2006.01)
*B01J 8/44* (2006.01)
*C01B 33/027* (2006.01)

(52) U.S. Cl.
CPC ........... *B01J 8/1827* (2013.01); *B01J 8/1836* (2013.01); *C01B 33/027* (2013.01); *B01J 2208/00752* (2013.01); *B01J 2208/00902* (2013.01)

(58) Field of Classification Search
CPC ............... B01J 8/1827; B01J 8/1836; B01J 2208/00752; B01J 2208/00902; B01J 8/44;
(Continued)

(56) References Cited

U.S. PATENT DOCUMENTS

| | | |
|---|---|---|
| 4,786,477 A | 11/1988 | Yoon et al. |
| 4,900,411 A | 2/1990 | Poong et al. |

(Continued)

FOREIGN PATENT DOCUMENTS

| | | |
|---|---|---|
| EP | 2653446 A2 | 10/2013 |
| WO | 0240400 A1 | 5/2002 |

(Continued)

*Primary Examiner* — Huy Tram Nguyen
(74) *Attorney, Agent, or Firm* — Brooks Kushman P.C.

(57) ABSTRACT

A subject of the invention is a fluidized-bed reactor for producing granular polycrystalline silicon. The fluidized-bed reactor comprises a segmented reactor tube, which is disposed between a reactor top and a reactor bottom, a heating facility, at least one nozzle for supplying fluidizing gas, at least one nozzle for supplying reaction gas, a facility for supplying silicon seed particles, a product removal line, and an offgas removal line. The segmented reactor tube comprises a base segment and at least one spacer segment, there being disposed, between base segment and spacer segment, a flat seal made from a carbon-containing material, the spacer segment consisting of a material which, within a temperature range from 100 to 950° C., has a thermal conductivity of <2 W/mK.

17 Claims, 3 Drawing Sheets

(58) Field of Classification Search
CPC ...... B01J 2208/00415; B01J 2219/0002; B01J 2208/0053; B01J 2208/00761; B01J 2208/00212; B01J 8/1818; B01J 8/1872; C01B 33/027
USPC ........................................................ 422/145
See application file for complete search history.

(56) References Cited

U.S. PATENT DOCUMENTS

| | | | |
|---|---|---|---|
| 8,802,046 B2* | 8/2014 | Weckesser | C01B 33/027 |
| | | | 423/349 |
| 9,254,470 B1* | 2/2016 | Spangler | B01J 8/1836 |
| 9,446,367 B2* | 9/2016 | Miller | B01J 8/1827 |
| 2004/0047795 A1 | 3/2004 | Konig et al. | |
| 2013/0280533 A1 | 10/2013 | Weckesser et al. | |
| 2014/0174353 A1 | 6/2014 | Spangler et al. | |
| 2016/0115591 A1 | 4/2016 | Weckesser | |
| 2016/0289141 A1* | 10/2016 | Bachmann | B01J 8/1872 |
| 2017/0158516 A1 | 6/2017 | Pedron et al. | |
| 2018/0297852 A1 | 10/2018 | Pedron et al. | |

FOREIGN PATENT DOCUMENTS

| | | |
|---|---|---|
| WO | 2014099502 A1 | 6/2014 |
| WO | 2014184043 A1 | 11/2014 |
| WO | 2015197498 A1 | 12/2015 |
| WO | 2017092985 A1 | 6/2017 |

* cited by examiner

FLUIDIZED BED REACTOR FOR PRODUCTION OF GRANULAR POLYCRYSTALLINE SILICON

CROSS REFERENCE TO RELATED APPLICATIONS

This application is the U.S. National Phase of PCT Appln. No. PCT/EP2017/071258 filed Aug. 23, 2017, the disclosure of which is incorporated in its entirety by reference herein.

BACKGROUND OF THE INVENTION

1. Field of the Invention

The invention relates to a fluidized-bed reactor and also to a process for producing granular polycrystalline silicon.

2. Description of the Related Art

Granular polycrystalline silicon is manufactured in a fluidized-bed or fluid-bed reactor. This is accomplished by using a gas flow to fluidize seed particles of silicon in a fluidized bed, which is heated to high temperatures via a heating facility. The addition of a silicon-containing reaction gas produces a deposition reaction on the hot particle surface, with elemental silicon being deposited on the seed particles. This causes the seed particles to grow in diameter. Through the regular withdrawal of fully grown particles and addition of further silicon seed particles, the process can be operated continuously. Examples of silicon-containing reaction gas that can be used include silicon-halogen compounds (e.g., chlorosilanes or bromosilanes), monosilane ($SiH_4$), and mixtures of these gases with hydrogen.

Deposition processes and facilities for their implementation are well known. By way of example, reference may be made to U.S. Pat. Nos. 4,786,477, 4,900,411A.

A general problem affecting fluidized-bed reactors may be that of contamination of the fluidized bed and hence of the granular polycrystalline silicon at the operating temperature of the reactor. Such instances of contamination are brought about in particular by materials from which the reactor is constructed, and especially the reactor tube, in whose interior the deposition takes place. It has emerged, for example, that nickel from nickel-containing steels diffuses into the fluidized bed and contaminates the granular silicon. Other stainless steel components with a high potential for contamination are iron and chromium.

In order to prevent or at least minimize such contamination it is possible, for example, to employ ceramic linings or coatings. Thus WO2015/197498A1 describes a fluidized-bed reactor having a reactor tube having a base body of which at least 60 wt % consists of silicon carbide and which has on its inside a coating of which at least 99.99 wt % consists of silicon carbide. A problem is that over its entire length, the ceramic lining is subject to thermal and mechanical stresses which may result in mechanical defects.

The stated thermal and mechanical stresses are a further general problem affecting fluidized-bed reactors. The mechanical stresses comprise, in particular, compressive stresses, which may be brought about by the fixing of the reactor tube between a reactor top and reactor bottom. The thermal stresses come about in particular as a result of axial temperature gradients. These temperature gradients typically occur when the reactor tube is subjecting to locally confined heating, especially in the region of the fluidized bed. Axial temperature gradients may occur in particular between a heated fluidized-bed zone of the reactor tube and cooled fixings (e.g., reactor top and reactor bottom) and can lead to cracks in the peripheral direction or in the longitudinal direction.

In principle, in order to distribute and remove mechanical and thermal loads, it is possible for tube sections made from a ceramic, graphitic or quartz-based material to be flanked at least on one side by metal segments. The metal segments, however, may constitute a source of contamination. For example, soft metals tend to wear away (abrasion) by contact with the fluidized silicon particles. The silicon particles may be contaminated by the abraded metal particles. As a result of the abrasion, furthermore, cracks may appear in the metallic segments. Maintenance of these segments necessitates shutdown of the reactor.

WO2002/40400A1 discloses a reactor for producing high-purity granular silicon by decomposition of a silicon-containing gas. The reactor consists of a carbon fiber-reinforced material based on silicon carbide. In this case, the heat insulation regions at the bottom and at the top of the reactor consist of a carbon fiber-reinforced silicon carbide material having a relatively low thermal conductivity, while the other regions consist of a carbon fiber-reinforced silicon carbide material with a high thermal conductivity. In this way, thermal stresses are intended to be very largely avoided.

A problem is that a reactor tube of this kind may exhibit restrictions in relation to gas imperviosity, in relation to an inert gas located in an intermediate jacket of the reactor. Moreover, contamination of the granular silicon with carbon originating from the silicon carbide is likely.

WO2011/099502A1 describes linings for use in fluidized-bed reactors for the pyrolytic decomposition of silicon-containing gas. The lining is disposed in the interior of the reactor tube and has an at least two-part construction. It comprises a middle section made from a low-contamination nonmetal, such as quartz or silicon carbide, for example, and also a lower section which has a surface made from a martensitic steel alloy.

A disadvantage is that on cooling or because of the difference in thermal expansion between the two materials, damage such as instances of delamination or loss of material, or even material failures, can occur, even during the operation.

SUMMARY OF THE INVENTION

It was an object of the invention, therefore, to provide a fluidized-bed reactor for producing granular polycrystalline silicon that avoids the disadvantages known from the prior art. These and other objects are achieved by means of a fluidized-bed reactor for producing granular polycrystalline silicon, comprising a segmented reactor tube disposed between a reactor top and a reactor bottom, a heating facility, at least one nozzle for supplying fluidizing gas, at least one nozzle for supplying silicon-containing reaction gas, a facility for supplying silicon seed particles, a product removal line, and an off gas removal line, where the segmented reactor tube comprises a base segment, to which the heating facility is assigned, and at least one spacer segment, there being disposed, between the base segment and the spacer segment, a flat seal made from a carbon-containing material, and the spacer segment consisting of a material which within a temperature range from 100 to 950° C. has a thermal conductivity of <2 W/mK.

DETAILED DESCRIPTION OF THE PREFERRED EMBODIMENTS

Figure 1:
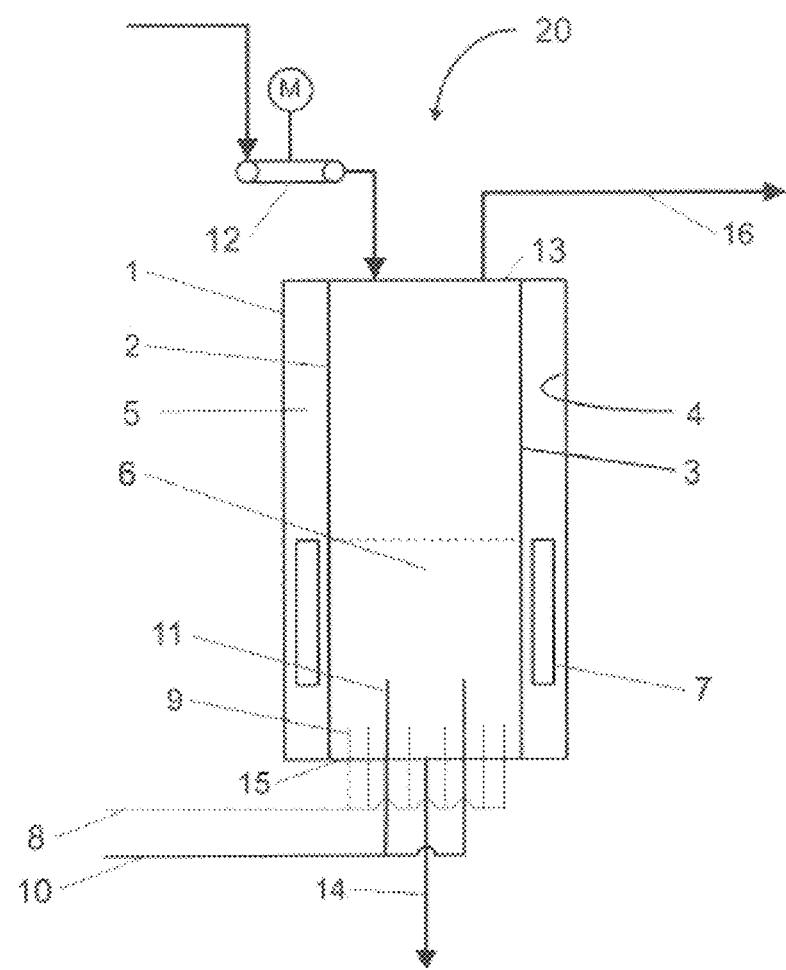
FIG. 1 illustrates a schematic construction of a fluidized-bed reactor

The material of the spacer segment preferably has a thermal conductivity of less than 2 W/mK within a temperature range from 150 to 800° C., more preferably 250 to 600° C.

The material of the spacer segment preferably comprises a fused silica (or fused quartz), more particularly a pure, opaque white, or black fused silica. The fused silica consists preferably of amorphous silicon dioxide, obtained in particular from quartzite. With particular preference, the material of the spacer segment comprises no further adjuvants other than silicon. Opaque white fused silica is fused silica which appears an opaque white as a result of inclusions of gas in the material. Black fused silica is a fused silica having a fraction of free silicon.

The base segment consists preferably of a material which within a temperature range from 500 to 1400° C., preferably 600 to 1250° C., has a thermal conductivity of between 20 and 100 W/mK, preferably between 30 and 90 W/mK, more preferably between 40 and 80 W/mK.

The material of the base segment is preferably selected from the group of silicon, silicon nitride ($Si_3N_4$), silicon carbide (SiC), steel, graphite, and carbon-carbon composition material (e.g., carbon fiber-reinforced carbon).

The material of the base segment preferably comprises sintered SiC, nitride-bonded SiC, recrystallized SiC, or reaction-bonded SiC. Mixtures of these are also conceivable.

With particular preference the material of the base segment comprises isostatically pressed graphite or a wound graphite sheet.

Furthermore, it may be preferable for the base segment and/or the spacer segment to comprise a coating. The coating is preferably attached on an inner wall (that is, on a wall directed into the reactor interior). With particular preference the base segment on its inner wall has a coating of SiC, $Si_3N_4$ or silicon. Coating of the segment as a whole is also possible.

The carbon-containing material of the flat seal preferably comprises graphite, more particularly expanded graphite. The flat seal generally comprises a substantially cylindrical seal whose dimensions are defined via the inside and outside diameters and also via the thickness. The ratio between outside diameter and inside diameter is preferably between 1 and 1.2, more preferably between 1.02 and 1.10. The thickness is preferably 1 to 10 mm, more preferably 1.5 to 5 mm.

The base segment forms a section of the reactor tube in which the fluid bed is located when the fluidized-bed reactor is in operation; the fluidized bed does not necessarily extend over the entire section. The place at which the fluidized bed is located may also be designated the reaction zone. Because of the thermal conductivity of the base segment, the heat required in the reaction zone can be supplied effectively by the heating facility which is assigned to the base segment.

The spacer segment adjoins (via the interposed flat seal) the base segment and forms a section of the reactor tube in which, when the reactor is in operation, the prevailing temperature is lower than in the reaction zone. In general the temperature in this section does not exceed 950° C. The temperature in the region of the spacer segment is typically between 20° C. (in the vicinity of the reactor top and reactor bottom, respectively) and 500° C. (in the region of the flat seal). With preference no heating facility is assigned to this section. An upper end (in the direction of the reactor top) and/or a lower end (in the direction of the reactor bottom) of the fluidized bed may extend in the section of the reactor tube that is formed by the spacer segment. In particular, the lower end of the fluidized bed may extend into the section of the reactor tube that is formed by a spacer segment disposed between reactor bottom and base segment. The lower end of the fluidized bed may reach down to the reactor bottom.

Temperatures on an outside or inside of the reactor tube may be determined in principle by means of pyrometers (spectral or ratio pyrometers) or thermocouples. For temperature determination by means of pyrometers, it is possible for viewing windows to be disposed in the reactor vessel and/or reactor tube. The viewing windows consist typically of fused silica, borosilicate glass, $BaF_2$, sapphire glass, ZnSe, ZnS, $CaF_2$, $BaF_2$ or $MgF_2$.

Thermocouples may be disposed at different axial positions and optionally different tangential positions on the outer reactor tube. At least two such measurements at different axial positions are customary.

According to one preferred embodiment, the reactor tube comprises a further spacer segment which flanks the base segment, there being preferably likewise disposed, between the base segment and the further spacer segment, a flat seal made from a carbon-containing material.

The reactor tube preferably consists of three segments, more particularly one base segment and two spacer segments.

The reactor tube is preferably fixed between the reactor bottom and the reactor top. Accordingly, reactor top and reactor bottom may also be referred to as fixings. By "fixed" is meant that the reactor tube is subjected to a pressure in the axial direction. For the fixing it is possible to use tension springs and compensators.

Disposed between the reactor bottom and the reactor tube and/or between the reactor top and the reactor tube, preferably, is a seal made from a carbon-containing material. The seal is preferably likewise a flat seal as described above. However, it may also be a seal in O-ring form, which in particular may consist of the same materials as the flat seal described.

The reactor bottom and/or the reactor top preferably comprises recesses for accommodating the seal. In this way, contact between the seal and the reactor interior can be prevented. This is beneficial for the durability of the seal, and also reduces the risk of product contamination.

The spacer segment, optionally via an interposed seal, preferably adjoins the reactor top or the reactor bottom. In other words, the spacer segment on at least one side forms the end of the reactor tube.

The reactor top and/or the reactor bottom, or the fixings, preferably possess a coolant circuit. With preference both the reactor top and the reactor bottom possess a separate coolant circuit. Water is the preferred coolant used. The temperature of the coolant can be determined by measuring the temperature of the coolant, using resistance thermometers, for example, at a coolant inlet and at a coolant outlet.

Because of the arrangement of the fluidized bed in the reactor tube, there is a flow of heat from the reaction zone toward the typically cooled reactor top and the reactor bottom, or toward the fixings. Put more simply, the reactor tube is heated in the region of its middle, whereas its ends are cooled. There are therefore axial temperature gradients in the reactor tube. At the place where they occur, the axial temperature gradients lead to a mechanical load on the reactor tube.

As a result of the segmented (multi-part) design of the reactor tube in accordance with the invention, axial temperature gradients are very largely displaced into the spacer segment with low thermal conductivity. The low average thermal conductivity of the spacer segment, of less than 2 W/mK, results in a reduced heat loss. Fused silica in particular, within a temperature range between 20 and 500° C., has an average thermal conductivity of only 1.7 W/mK and is therefore able to reduce significantly the heat loss via the generally cooled reactor top and/or reactor bottom. As a result of the lower heat flow in axial direction, accordingly, the axial temperature gradient in the base segment is also reduced.

Furthermore, in the temperature range between 0 and 500° C., fused silica has only a low coefficient of thermal expansion, of 0.4 to $0.7*10^{-6}$ $K^{-1}$. Moreover, fused silica has only a low modulus of elasticity (elastic modulus) of 50,000 to 80,000 MPa. As a result, the thermally induced stresses in this material are low.

The use of fused silica results, furthermore, in an improvement in the product quality, since no metals (e.g., nickel) are released during the deposition, as may be the case, for example, with martensitic steel alloys. In the case of fused silica, furthermore, in contrast to segments made from SiC or from graphite coated with SiC, there is no release of carbon by abrasion or by chemical attack by the reaction gas.

By using the flat seal between base segment and spacer segment, surprisingly, the thermal load-bearing capacity of the reactor tube, particularly of the heated section, can be further increased. The carbon-containing material of the flat seal prevents direct frictional contact between the segments. The flexible seal material is able to absorb different radial expansions of the segments. In this way, there is a mechanical decoupling of the segments, and the thermally induced stresses, especially tangential stresses, in the reactor tube as a whole are minimized.

According to a further embodiment, the base segment and the spacer segment each comprise two end faces, where at least one of the end faces, between which the flat seal is disposed has a profile in which the flat seal is disposed in such a way that a flat seal side facing into the reactor interior is shielded.

By "shielded" here is meant in particular that the flat seal is disposed behind a wall of the profile in such a way that the flat seal side facing into the reactor interior faces the wall of the profile.

The shielding of the flat seal results in a further reduction in contamination, since the carbon-containing material is protected from direct particle contact and gas contact from the reactor interior. In this way, any release of carbon from the seal material by abrasion or by a chemical attack of the reaction gases is minimized or entirely prevented.

The spacer segment preferably comprises 80 to 300%, more preferably 100 to 250%, and most preferably 150 to 200% of the wall thickness of the base segment.

Furthermore, the base segment preferably has a length $L_B$ which corresponds to between 50 and 99%, preferably between 60 and 98%, and most preferably between 70 and 97% of a length $L_B$ of the reactor tube.

A further aspect of the invention is a process for producing granular polycrystalline silicon that is implemented in the fluidized-bed reactor described. The process comprises fluidization of silicon seed particles by means of a gas flow in a fluidized bed which is heated by means of a heating facility, with addition of a silicon-containing reaction gas producing deposition of polycrystalline silicon on the silicon seed particle surfaces.

The resultant granular polycrystalline silicon is preferably taken off from the fluidized-bed reactor. Subsequently, any silicon deposits formed on the inner wall (wall deposits) of the reactor tube and other reactor components can be removed by the feeding of an etching gas into the reaction zone. The etching gas preferably comprises hydrogen chloride or silicon tetrachloride.

During the deposition of polycrystalline silicon on the hot silicon seed particle surfaces, it is also preferred for etching gas to be supplied continuously, in order to prevent silicon deposits on the inner wall of the reactor tube and other reactor components. The etching gas is preferably fed locally within the area known as the free board zone (the gas space above the fluidized bed).

The wall deposits can be removed cyclically by etching gas in alternation with the deposition process. Alternatively, etching gas can be supplied continuously during the deposition in order to prevent the development of wall deposits.

The process is preferably operated continuously, by continuous take-off from the reactor of silicon particles fully grown in their diameter as a result of the deposition, and the metered addition of fresh silicon seed particles.

A silicon-containing reaction gas used with preference is trichlorosilane. The temperature of the fluidized bed in the reaction zone in this case is at least 900° C. and preferably at least 1000° C. The temperature of the fluidized bed is preferably at least 1100° C., more preferably at least 1150° C., more particularly at least 1200° C. The temperature of the fluidized bed in the reaction zone may also amount to 1300 to 1400° C. According to one particularly preferred embodiment, the temperature of the fluidized bed in the reaction zone is 1150 to 1250° C. Within this temperature range a maximum deposition rate is achieved, but drops off again if temperatures continue to climb.

Another silicon-containing reaction gas that can be used is monosilane. In that case the temperature of the fluidized bed in the reaction zone is preferably 550 to 850° C. Yet another silicon-containing reaction gas that can be used is dichlorosilane. The temperature of the fluidized bed in the reaction zone in that case is preferably 600 to 1000° C.

The fluidizing gas is preferably selected from the group of hydrogen, argon, nitrogen, and mixtures thereof.

The reaction gas is introduced into the fluidized bed via one or more nozzles. The local gas velocities at the exit of the nozzles are preferably 0.5 to 200 m/s. The concentration of the silicon-containing reaction gas, based on the entire quantity of gas flowing through the fluidized bed, is preferably 5 to 50 mol %, more preferably 15 to 40 mol %.

The concentration of the silicon-containing reaction gas in the reaction gas nozzles, based on the entire quantity of gas flowing through the reaction gas nozzles, is preferably 5 to 80 mol %, more preferably 14 to 60 mol %.

The absolute reactor pressure preferably varies in the range from 1 to 10 bar, more preferably 1.5 to 5.5 bar.

In the case of a reactor having an internal diameter of the reaction zone of 400 mm, for example, the mass flow of silicon-containing reaction gas is preferably 30 to 600 kg/h. The hydrogen volume flow is preferably 50 to 500 $Nm^3$/h. For larger reactors, larger quantities of silicon-containing reaction gas and hydrogen are preferred.

Certain operating parameters are known to be selected according to reactor size. Those below are therefore stated for a standardized reactor cross-sectional area.

The specific mass flow of silicon-containing reaction gas is preferably 400 to 6500 kg/(h*m$^2$). The specific hydrogen volume flow is preferably 800 to 4000 Nm$^3$/(h*m$^2$). The specific fluidized-bed weight is preferably 700 to 2000 kg/m$^2$. The specific silicon seed particle metering rate is preferably 1 to 100 kg/(h*m$^2$). The specific reactor heating power is preferably 800 to 3000 kW/m$^2$. The residence time of the reaction gas in the fluidized bed is preferably 0.1 to 10 s, more preferably 0.2 to 5 s.

FIG. 1 shows a fluidized-bed reactor 20 which comprises a reactor vessel 1 with a segmented reactor tube 2 inserted into it (the segmentation is not shown). The reactor tube 2 is fixed between a reactor top 13 and a reactor bottom 15. Located between an inner wall 4 of the reactor vessel 2 and an outer wall 3 of the reactor tube 2 there is an intermediate space 5. This space typically contains insulating material and may be filled with an inert gas. The pressure in the intermediate space 5 is higher than in the interior of the reactor tube 2. With the reactor 20 in operation, a fluidized bed 6 is located within the region shown by dashed lines. The fluidized bed 6 is heated by means of a heating facility 7. The reaction tube 2 is supplied via a line 8 and nozzles 9 with a fluidizing gas. A reaction gas mixture is supplied via a line 10 and nozzles 11. The height of the nozzles 11 for supplying the reaction gas mixture may differ from the height of the nozzles 9 for supplying the fluidizing gas.

The reactor tube 2 is supplied at the reactor top 13 with silicon seed particles via a facility 12. Completed granular polysilicon is removed via a product removal line 14 at the reactor bottom 15. At the reactor top 13, furthermore, off gas is taken off via an off gas removal line 16.

Figure 2:
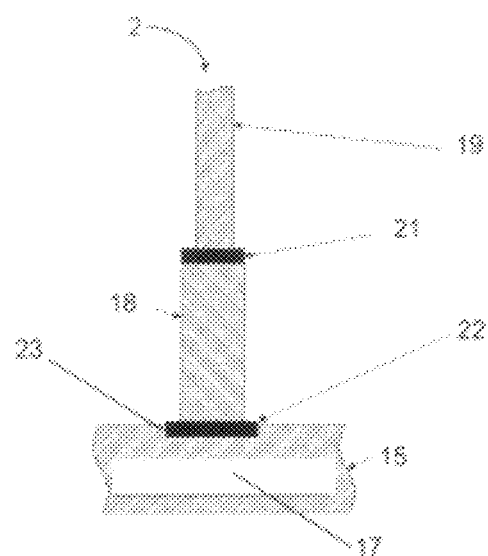
FIGS. 2 to 5 illustrate sectional representations of a reactor tube according to embodiments of a fluidized-bed reactor of the invention

FIG. 2 shows a sectional representation of the segmented reactor tube 2 in the region of the reactor bottom 15 according to one preferred embodiment of the fluidized-bed reactor of the invention.

The reactor bottom 15 is a bottom plate which comprises a cooling circuit 17. The reactor tube is fixed between the reactor bottom 15 and the reactor top 13, which is not shown. A cylindrical spacer segment 18 adjoins a base segment 19 via a flat seal 21. The reactor tube 2 therefore consists of two segments. The thickness of the spacer segment 18 is about 175% of the thickness of the base segment 19. Disposed between the spacer segment 18 and the reactor bottom 15 is a seal 22 which is set partly into a recess 23 in the reactor bottom 15.

Figure 3:
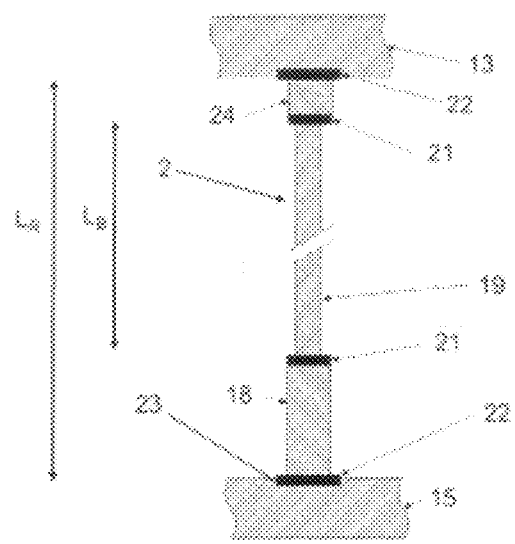

FIG. 3 shows a sectional representation of the segmented reactor tube 2 in the region of the reactor bottom 15 and of the reactor top 13 according to one preferred embodiment of the fluidized-bed reactor 20 of the invention.

In contrast to the embodiment according to FIG. 2, the reactor tube 2 has a further spacer segment 24, which adjoins the base segment 19 via a flat seal 21 and adjoins the reactor top 13 via a seal 22. The reactor tube 2 therefore consists of three segments. In terms of length, the spacer segment 24 is shorter in design than the spacer segment 18, since the temperature in the upper region of the reactor tube is lower than in the lower region if the heating facility 7 is disposed in the lower half of the intermediate space 5 (cf. FIG. 1). The length $L_B$ of the base segment is about 85% of the total length $L_B$ of the reactor tube 2. Cooling circuits in the reactor top 13 and reactor bottom 15 have not been shown.

Figure 4:
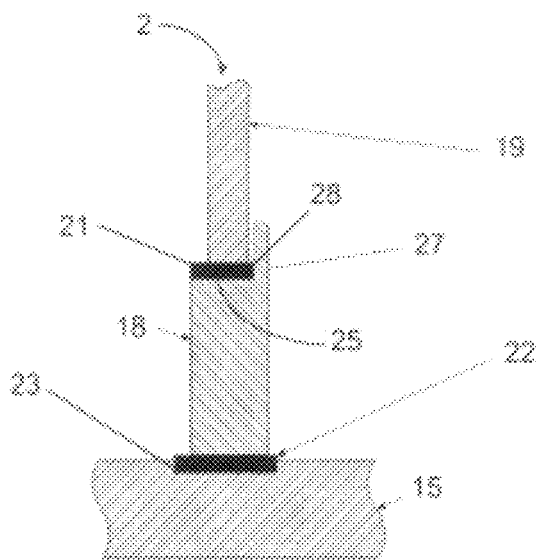

FIG. 4 shows a sectional representation of the segmented reactor tube 2 in the region of the reactor bottom 15 according to one preferred embodiment of the fluidized-bed reactor 20 of the invention.

In contrast to the design as per FIG. 2, the spacer segment 18 has a profile 27 on an end face 25 facing the base segment 19. The flat seal 21 is disposed behind the profile 27, and so a flat seal side 28 facing the reactor interior (right-hand side of the reactor tube 2) is shielded.

Figure 5:
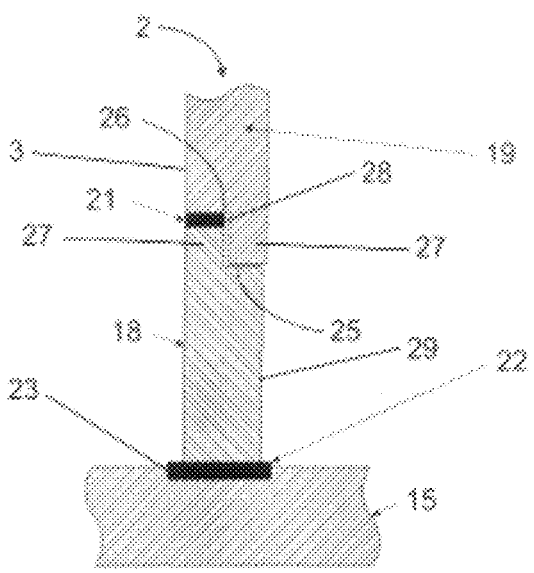

FIG. 5 shows a sectional representation of the segmented reactor tube 2 in the region of the reactor bottom 15 according to one preferred embodiment of the fluidized-bed reactor 20 of the invention.

Both the end face 25 of the spacer segment 18 and an end face 26 of the base segment have a profile 27. The spacer segment 18 and the base segment 19 have approximately the same wall thickness. The profiles 27 are assembled with an interposed flat seal 21 in such a way that the base segment 19 and the spacer segment 18 are flush on the outer wall 3 of the reactor tube 2. On an inner wall 29 of the reactor tube 2 as well, the segments 18, 19 are essentially flush. As in the design according to FIG. 4, the flat seal 21 is shielded by the profiling of the end faces 25, 26.

Comparative Example

A fluidized-bed reactor with a nonsegmented reactor tube and a reactor bottom with cooling water circuit is operated with trichlorosilane at a fluidized-bed temperature of 900° C. At a reactor tube diameter of 0.8 m, and overall length of 2.5 m, it is possible to achieve a silicon deposition rate of 63.3 kg/h of granular silicon. The reactor tube material used is graphite with an SiC coating. The temperature gradient in the reactor tube is not more than 4050 K/m and is located between a lower edge of the heating facility (cf. FIG. 1) and the reactor bottom. The axial heat flow into the cooled reactor bottom is 5.09 kW. A further increase in the fluidized-bed temperature and hence in the deposition rate is not possible, since the reactor tube would rupture between heating facility and reactor bottom (maximum temperature gradient).

Inventive Example

A fluidized-bed reactor according to FIG. 4 (reactor tube in two segments, otherwise identical in construction) may be operated with trichlorosilane, in contrast, at a fluidized-bed temperature of 1050° C. The base segment consists of SiC-coated graphite. The spacer segment consists of opaque fused silica. Disposed in between is a flat seal made from expanded graphite. Located between reactor bottom and spacer segment is a flat seal made from a fluoroelastomer (Viton®). The dimensions of the silica tube section are such that the base segment end face facing the spacer segment attains a temperature of approximately 650° C. The length of the spacer segment is 45 mm. The maximum axial temperature gradient in the reactor tube is reduced to 3420 K/m. The deposition rate has been able to be increased to 93.4 kg/h of granular silicon. It is still possible to increase the deposition rate further. The axial lost heat flow into the cooled reactor bottom is 0.5 kW.

The lost heat flow can be calculated by means of a heat balance on the cooling circuit of the reactor bottom, in accordance with the following formula:

$$Q_{constraint} = \dot{m}_{cw} \bar{c}_{p,cw}(T_{cw\ out} - T_{cw\ in})$$

$Q_{constraint}$: heating quantity over the fixing [W]
CW(Index): cooling water
$\dot{m}_{cw}$: mass flow of cooling water for cooling the fixing [kg/s]
$\bar{c}_{p,cw}$: average specific heat capacity of the stated cooling water [J/(kg K)]
$T_{cw\ in}$: entry temperature of the cooling water [K]

$T_{cw\ out}$: exit temperature of the cooling water [K]

The invention claimed is:

1. A granular polycrystalline silicon fluidized-bed reactor, comprising: a segmented reactor tube disposed between a reactor top and a reactor bottom, one or more heaters, at least one nozzle for supplying fluidizing gas, at least one nozzle for supplying silicon-containing reaction gas, a silicon seed particle feed, a product removal line, and an offgas removal line, wherein the reactor tube comprises a base segment and at least one spacer segment, there being disposed, between base segment and spacer segment, a flat seal of a carbon-containing material, the spacer segment constructed of a material which, within a temperature range from 100 to 950° C., has a thermal conductivity of <2 W/mK.

2. The fluidized-bed reactor of claim 1, wherein the material of the spacer segment comprises fused silica.

3. The fluidized-bed reactor of claim 1, wherein the base segment consists of a material which, within a temperature range from 500 to 1400° C., has a thermal conductivity of between 20 and 100 W/mK.

4. The fluidized-bed reactor of claim 1, wherein at least one material of the base segment is selected from the group consisting of silicon, silicon nitride, silicon carbide, steel, graphite, carbon fiber-reinforced carbon, and carbon-carbon composite material.

5. The fluidized-bed reactor of claim 4, wherein the material of the base segment comprises isostatically pressed graphite.

6. The fluidized-bed reactor of claim 1, wherein the base segment and/or the spacer segment comprise a coating.

7. The fluidized-bed reactor of claim 1, wherein the carbon-containing material of the flat seal comprises graphite.

8. The fluidized-bed reactor of claim 1, wherein the carbon-containing material of the flat seal comprises expanded graphite.

9. The fluidized-bed reactor of claim 1, wherein the reactor tube comprises a further spacer segment which adjoins the base segment, there being likewise disposed, between base segment and the further spacer segment, a flat seal made from a carbon-containing material.

10. The fluidized-bed reactor of claim 1, wherein the reactor tube is fixed between the reactor bottom and the reactor top.

11. The fluidized-bed reactor of claim 1, wherein disposed between reactor bottom and reactor tube and/or between reactor top and reactor tube, there is a seal made from a carbon-containing material.

12. The fluidized-bed reactor of claim 11, wherein the reactor bottom and/or the reactor top comprise a recess for accommodating the seal.

13. The fluidized-bed reactor of claim 1, wherein the base segment and the spacer segment each have two end faces, where at least one of the end faces, between which the flat seal is disposed, has a profile, where the flat seal is disposed behind a wall of the profile such that a flat seal side facing into the reactor interior faces the wall of the profile.

14. The fluidized-bed reactor of claim 1, wherein the spacer segment comprises 80 to 300% of the wall thickness of the base segment.

15. The fluidized-bed reactor of claim 1, wherein the spacer segment comprises 100 to 250% of the wall thickness of the base segment.

16. The fluidized-bed reactor of claim 1, wherein the base segment has a length ($L_B$) which corresponds to between 50 and 99% of a length ($L_R$) of the reactor tube.

17. The fluidized-bed reactor of claim 1, wherein the base segment has a length ($L_B$) which corresponds to between 60 and 98% of a length ($L_R$) of the reactor tube.

* * * * *